UNITED STATES PATENT OFFICE.

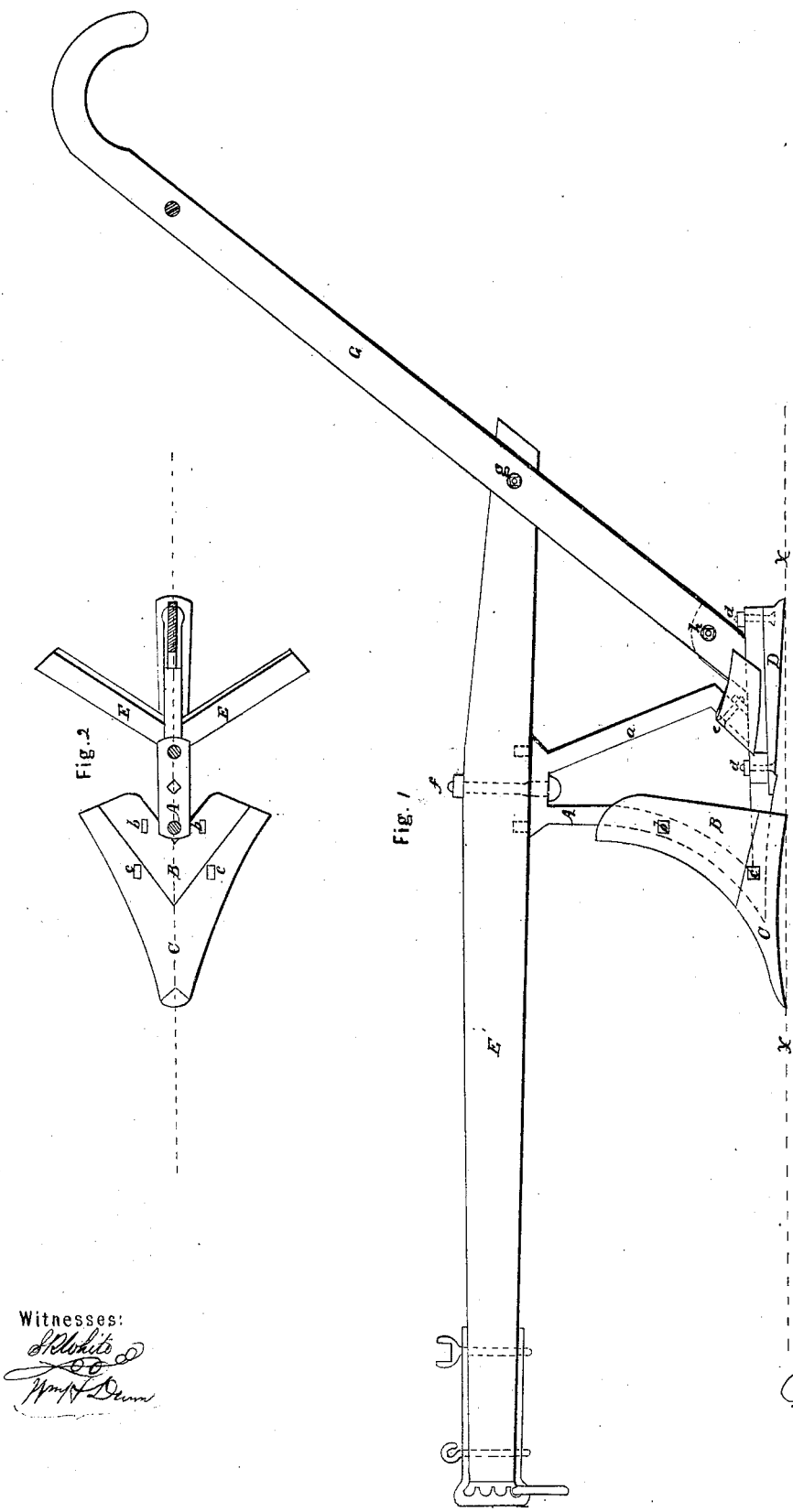

SETH MARCH, OF NORFOLK, VIRGINIA.

IMPROVEMENT IN PLOWS.

Specification forming part of Letters Patent No. 63,276, dated March 26, 1867.

Be it known that I, SETH MARCH, of Norfolk, in the county of Norfolk, in the State of Virginia, have invented a new and useful Improvement in Plows; and I do hereby declare that the following is a full and exact description thereof, reference being had to the accompanying drawings, and to the letters of reference marked thereon.

Figure 1 represents a longitudinal vertical view of the plow stocked. Fig. 2 is a longitudinal and transverse view of the skeleton, or iron-work alone, taken on a line of its base—that is, from $x$ to $x$ of Fig. 1.

A represents a solid cast-iron frame, to which all the other parts are attached. B represents the mold-board, which is snugly fitted to front or standard part of frame, and secured thereto by means of two common plow-bolts, the heads of which are shown at $b$. C marks the share, which is snugly fitted to the frame and mold-board, and secured to the latter by two plow-bolts, $c$. D, the heel, fits snugly under bar part of the frame, and is secured thereto by two plow-bolts, $d$, as plainly shown in Fig. 1. E, the weeder, is also secured to the frame by a common plow-bolt, $c$. It fits to the lower end of the brace part $a$, where a fine formation is made by two angles to receive it, as is shown in Fig. 1.

G represents the handles, having the usual curved and rounded hand-hold at upper end; coming down, pass closely on either side of the rear end of the beam, to which they are tightly fastened by carriage-bolt $g$; continuing downward, terminate at the rear end of frame-bar, on either side of a projection therefrom, to which they are firmly attached by carriage-bolt, (marked $h$.)

Feeling satisfied that the drawings, &c., hereto annexed fully elucidate the above description, I deem further explanation superfluous, and will therefore proceed at once to give my improvements, and try to explain the most important advantages of each feature of my invention.

I do not claim to be the inventor of the double mold-board plow, but the peculiar formation and combination of the parts, the manner in which they fit and are secured together, the improvements resulting in a saving of expense, time, and trouble to the farmer, as well as in the superior working qualities of the plow. To the best of my knowledge and belief there never has been in use a frame so constructed as to receive in like manner the mold-board, share-weeder, heel, beam, and handles of a plow. I therefore claim this frame as my invention.

I would call attention to the following as among its most striking advantages:

First, the earth not acting against any part of it when the plow is at work, as can be seen by Fig. 1, this frame will wear indefinitely. Then it is nearly as heavy as all the other castings combined; and as the whole skeleton, Fig. 2, is no heavier than any other of its working size, it follows that the other parts of this skeleton are much lighter, and therefore less expensive, than the corresponding parts of any other plow could be without a similar arrangement.

Second, the brace $a$ strongly secures the standard and bar parts together, thereby preventing them from being easily broken asunder by a sudden jar, to which all plows are constantly liable, from running against hidden roots, rocks, &c.; and, Third, the two dowels or solid cylindrical cast-iron projections on the top of the frame, as may be plainly seen in Fig. 1, give great additional security to the beam and relieve the bolt $f$ of much of its strain, only requiring it to hold the beam down upon them.

The difference between this mold-board and any other I have ever known to be in use exists mainly in its unique combination of being V-shaped, cast separate from the standard, fitted snugly to the frame, and secured thereto by means of ordinary plow-bolts. I therefore claim this mold-board as my invention.

Improvements: First, it enjoys all the advantages of the V shape for cutting the sod, &c.; second, while it will wear as long as any other mold-board, it is much lighter and less expensive than those which are cast in one piece with the standard or other non-wearing parts of the plow; third, its fastenings are the ordinary-shaped plow-bolts, which can be procured at any store in the city or country where farming-tools are sold, and at trifling cost.

The difference between this heel D and any other exists in its being made to fit under neath the bar altogether and its extending along the whole length of the wearing-surface of the bar; therefore I claim this heel D as my invention.

Improvements: First, without a heel the earth acts directly against the bar or land-side when the plow is at work, and as soon as a very small portion is worn off the whole bar or land-side becomes unserviceable and must be replaced by another, which, being much larger than a heel, is proportionately more expensive; second, the advantage of this over all other heels is, that this entirely protects the bar or land-side, while all others that I have ever seen only partially protect it—as, for example, in the Forrest pattern. That land-side will wear so much by the time its first heel is worn out that no new heel can fit on smoothly afterward.

The weeder F is peculiar in these, that it fits snugly, and is firmly secured to frame by an ordinary plow-bolt through its center, measured lengthwise. I therefore claim this weeder as a part of my invention.

Improvements: All the plows that have the weeder or "pulverizer," as they are sometimes called, to pass through the bar or land-side—as, for example, is the case with Borum & McClean's—have a serious objection, I think, in the fact that the weeder is constantly loose, and cannot be prevented from jumping or wabbling in and out of the ground when the plow is at work. This is owing to the impracticability of casting the hole in the bar so as to secure the weeder and fit it snugly. Mine fits snugly, and can easily be kept firmly fixed by means of the common plow-screw e.

The beam E and handles G are the same as used in other plows.

This plow is made complete without any of the wrought-iron work which a blacksmith usually has to make for others. With other plows, when a spindle, or standard, or mold-board bolt becomes unserviceable from any cause, which is very often the case, the use of the plow must be lost from the field. A man, and generally a horse and cart, must be sent with it to the blacksmith, however distant, and the smith must be paid several times the usual price of a carriage or plow bolt to repair the damage. The most of such time, inconvenience, trouble, and expense will be saved by using this plow. The farmer would only be required to keep such a stock of screws as would be necessary in using any other ordinary plow; and then, when one chances to fail, five minutes will suffice to put in another right on the spot, and the plow is in as perfect order again as before the failure, and without extra expense.

I will here add that this plow has been thoroughly tested by many of as good farmers as I know in the States of North Carolina and Virginia, in the cultivation of corn, cotton, and vegetables, and their testimony to its unrivaled merits is unanimous, unqualified, and complete. It has been invented only about ten months, and its celebrity is beyond precedent within the range of my knowledge for so short a career. The parts represented in the drawings by black lines are tough wood; those by blue ones are iron.

I claim—

The frame, the mold-board, the heel D, and the weeder, substantially as described.

S. MARCH.

Witnesses:
S. R. WHITE,
WM. H. DUNN.